United States Patent
Ni et al.

(10) Patent No.: US 10,484,411 B1
(45) Date of Patent: Nov. 19, 2019

(54) SYSTEM FOR ANOMALY DETECTION ON CAN BUS DATA WITH SPARSE AND LOW RANK DECOMPOSITION OF TRANSFER ENTROPY MATRIX

(71) Applicant: HRL Laboratories, LLC, Malibu, CA (US)

(72) Inventors: Kang-Yu Ni, Calabasas, CA (US); David W. Payton, Calabasas, CA (US)

(73) Assignee: HRL Laboratories, LLC, Malibu, CA (US)

(*) Notice: Subject to any disclaimer, the term of this patent is extended or adjusted under 35 U.S.C. 154(b) by 0 days.

(21) Appl. No.: 15/670,477

(22) Filed: Aug. 7, 2017

Related U.S. Application Data

(60) Provisional application No. 62/405,716, filed on Oct. 7, 2016.

(51) Int. Cl.
| | |
|---|---|
| *H04L 29/06* | (2006.01) |
| *G06F 13/362* | (2006.01) |
| *H04L 1/06* | (2006.01) |

(52) U.S. Cl.
CPC ...... *H04L 63/1425* (2013.01); *G06F 13/3625* (2013.01); *H04L 1/0681* (2013.01); *H04L 63/0218* (2013.01)

(58) Field of Classification Search
CPC ............ H04L 63/1425; H04L 63/0218; H04L 1/0681; G06F 13/3625
See application file for complete search history.

(56) References Cited

U.S. PATENT DOCUMENTS

| | | | |
|---|---|---|---|
| 2010/0275262 A1* | 10/2010 | Anand ............... | H04L 63/1416 726/23 |
| 2011/0276682 A1* | 11/2011 | Ding .................. | G06F 9/54 709/224 |

(Continued)

FOREIGN PATENT DOCUMENTS

KR          1334017 B1     12/2013

OTHER PUBLICATIONS

Notification of Transmittal of International Search Report and the Written Opinion of the International Searching Authority for PCT/US2017/045734; dated Nov. 10, 2017.

(Continued)

*Primary Examiner* — Nelson S. Giddins
(74) *Attorney, Agent, or Firm* — Tope-McKay & Associates

(57) ABSTRACT

Described is a system for detecting cyber intrusions based on analysis of network traffic. During operation, the system performs a statistical analysis of message timing on network traffic to produce a temporal dependency matrix representative of temporal dependency between different message types in the network traffic. The sets of temporal dependency matrices are decomposed into component matrices, where at least one component matrix represents typical properties of these matrices and at least one other component matrix represents atypical properties of the matrices. A new temporal dependency matrix is generated based on new network traffic. Finally, anomalous behavior is detected in the new network traffic by comparing component matrices of the new temporal dependency matrix with component matrices of the temporal dependency matrices under normal operation conditions.

26 Claims, 7 Drawing Sheets

(56) References Cited

U.S. PATENT DOCUMENTS

| | | | |
|---|---|---|---|
| 2014/0325364 A1 | 10/2014 | Tee et al. | |
| 2016/0156652 A1* | 6/2016 | Paffenroth | H04L 63/1425 726/23 |
| 2017/0013005 A1* | 1/2017 | Galula | H04L 63/1425 |

OTHER PUBLICATIONS

International Search Report of the International Searching Authority for PCT/US2017/045734; dated Nov. 10, 2017.

Written Opinion of the International Searching Authority for PCT/US2017/045734; dated Nov. 10, 2017.

Atef Abdelkefi, et al., "Robust Traffic Anomaly Detection with Principal Component Pursuit," ACM CoNEXT Student Workshop, Philadelphia, USA, Nov. 30, 2010, pp. 1-2.

E. Candes, X. Li, Y. Ma, and J. Wright, "Robust Principal Component Analysis?", IEEE PAMI 2011, pp. 201-204.

M. Mardani, G. Mateos, and G. B. Giannakis, "Unveiling anomalies in large-scale networks via sparsity and low rank," in Proc. of 45th Asilomar Conf. on Signal, Systems and Computers, Pacific Grove, CA, Nov. 2011, pp. 403-407.

Kang-Yu Ni and Tsai-Ching Lu, "Information Dynamic Spectrum Characterizes System Instability Toward Critical Transitions," EPJ Data Science, 3:28, 2014, pp. 1-25.

Thomas Schreiber, "Measuring Information Transfer", Phys. Rev. Lett. 85(2): pp. 461-464, 2000.

M Staniek, K Lehnertz, "Symbolic Transfer Entropy". Phys. Rev. Lett. 100(15), 2008, pp. 158101-1-158101-4.

Taylor, Adrian, Nathalie Japkowicz, and Sylvain Leblanc. "Frequency-based anomaly detection for the automotive CAN bus", WCICSS 2015, pp. 45-49.

T. Zhou and D. Tao. "GoDec: Randomized low-rank & sparse matrix decomposition in noisy case." ICML 2011, pp. 1-8.

International Preliminary Report on Patentability for PCT/US2017/045734; dated Nov. 30, 2018.

* cited by examiner

SYSTEM FOR ANOMALY DETECTION ON CAN BUS DATA WITH SPARSE AND LOW RANK DECOMPOSITION OF TRANSFER ENTROPY MATRIX

CROSS-REFERENCE TO RELATED APPLICATIONS

This is a non-provisional patent application of U.S. Ser. No. 62/405,716, filed on Oct. 7, 2016, the entirety of which is hereby incorporated by reference.

GOVERNMENT RIGHTS

This invention was made with government support under U.S. Government Contract Number D15PC00223, entitled, "Side Channel Causal Analysis for Design of Cyber-Physical Security." The government has certain rights in the invention.

BACKGROUND OF INVENTION (1) Field of Invention

The present invention relates to an anomaly detection system and, more specifically, to a system for detecting anomalies on CAN bus data using sparse and low rank decomposition.

(2) Description of Related Art

Anomaly detection is the process by which anomalous data can be detected to prevent attacks or intrusion of malicious data. Many known attacks on automobiles involve some form of spoofing or altering CAN bus messages. For instance, if an attacker can cause another module to go into diagnostic mode, they can stop that module's messages from appearing on the bus, which allows the attacker to replace those messages with their own. Depending on the module, these spoof messages can potentially put passengers in serious danger.

Attempts have been made to address this issue. For instance, the researchers in Tayler proposed a frequency-based anomaly detection method to compare current and historical packet timing (see the List of Incorporated Literature References below, Reference No. 6). Their algorithm measures inter-packet timing over a sliding window. They found that the Hamming distance of data packets was an unreliable measure of normality. The inter-packet timing statistic is reliable for detecting inserted packets, with a one-class support vector machine. However, if the normal packet is not periodic, then detection of extra insertions could be more challenging. Moreover, their method is unlikely to work for other types of attacks, such as changing the packet order.

Thus, a continuing need exists for a system that for anomaly detection on CAN bus data.

SUMMARY OF INVENTION

This disclosure provides a system for detecting cyber intrusions based on analysis of network traffic. The system comprises one or more processors and a memory. The memory is a non-transitory computer-readable medium having executable instructions encoded thereon, such that upon execution of the instructions, the one or more processors perform several operations. During operation, the system performs a statistical analysis of message timing on network traffic to produce a temporal dependency matrix representative of temporal dependency between different message types in the network traffic. The sets of temporal dependency matrices are decomposed into component matrices, where at least one component matrix represents typical properties of these matrices and at least one other component matrix represents atypical properties of the matrices. A new temporal dependency matrix is generated based on new network traffic. Finally, anomalous behavior is detected in the new network traffic by comparing component matrices of the new temporal dependency matrix with component matrices of the temporal dependency matrices under normal operating conditions.

In another aspect, the temporal dependency matrix representative of temporal dependency between different message types in the network traffic is a Transfer Entropy Matrix (TEM) produced using Transfer Entropy calculations.

Further, decomposing sets of temporal dependency matrices into component matrices is performed using sparse low-rank decomposition.

In another aspect, detecting anomalous behavior in the new network traffic is per by first performing sparse low-rank decomposition of individual Transfer Entropy matrices (TEM) and then comparing an $\ell_1$ norm of a sparse component, $\|z_s\|_1$ with a mean of a training set norm.

Further, detecting anomalous behavior in the new network traffic further comprises determining a norm and standard deviation from sparse low-rank, decompositions of multiple TEMs and performing a t-test to determine if the new network traffic exceeds a pre-set bound.

In another aspect, upon detecting anomalous behavior in the new network traffic, the system initiates a reactive response. The reactive response includes causing a vehicle to initiate a safe-mode, where at least one vehicle system is disabled.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
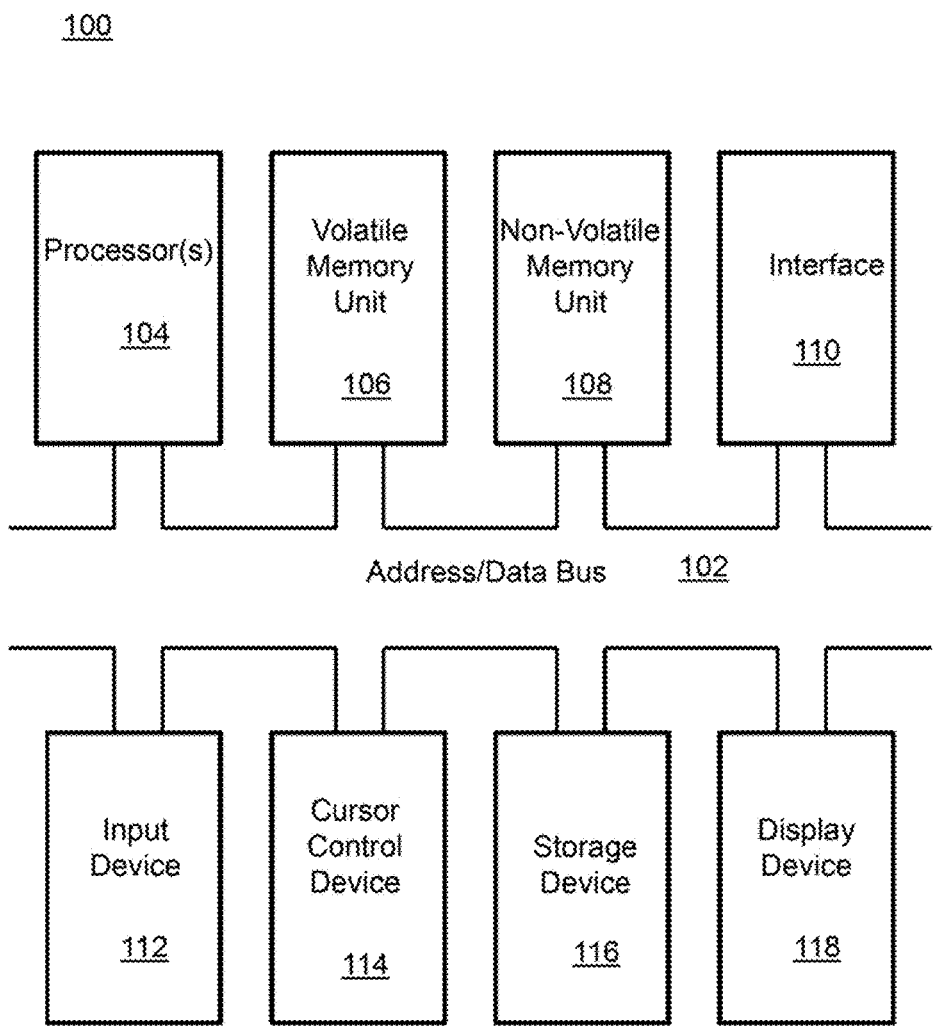
FIG. 1 is a block diagram depicting the components of a system according to various embodiments of the present invention.

The present invention relates to an anomaly detection system and, more specifically, to a system for detecting anomalies on CAN bus data using sparse and low rank decomposition. The following description is presented to enable one of ordinary skill in the art to make and use the invention and to incorporate it in the context of particular applications. Various modifications, as well as a variety of uses in different applications will be readily apparent to those skilled in the an, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific derails are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" is the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though flatly set forth herein. The references are cited in the application by referring to the corresponding literature reference number, as follows:

1. E. Candes, X. Li, Y. Ma, and J. Wright, "Robust Principal Component Analysis?", IEEE PAMI 2011.

2. M. Mardani, G. Mateos, and G. B. Giannakis, "Unveiling anomalies in large-scale networks via sparsity and low rank," in Proc. of 45th Asilomar Conf. on Signal, Systems and Computers, Pacific Grove, Calif., November 2011, pp. 403-407.

3. Kang-Yu Ni and Tsai-Ching Lu, "Information Dynamic Spectrum Characterizes System Instability Toward Critical Transitions," EPJ Data Science, 3:28, 2014.

4. Thomas Schreiber, "Measuring Information Transfer", Phys. Rev. Lett. 85(2): 461-464, 2000.

5. M. Staniek, K Lehnertz, "Symbolic Transfer Entropy". Phys. Rev. Lett. 100(15), 2008.

6. Taylor. Adrian, Nathalie Japkowicz, and Sylvian Leblanc. "Frequency-based anomaly detection for the automotive CAN bus", WCICSS 2015.

7. T. Zhou and D. Tao. "GoDec: Randomized low-rank & sparse matrix decomposition in noisy case.," ICML 2011.

(2) Principal Aspects

Various embodiments of the invention include three "principal" aspects. The first is a system for anomaly detection. The system is typically in the form of a, computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD) or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store, information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions, In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102. wherein the display device 118 is configured to display video and/or graphics. In an aspect, the display device 118 may include a cathode ray tube ("CRT"), liquid crystal display ("LCD"), field emission display ("TED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented, Indeed, the spirit and scope of the present technology is not limited to any single data processing environment.

Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks, or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
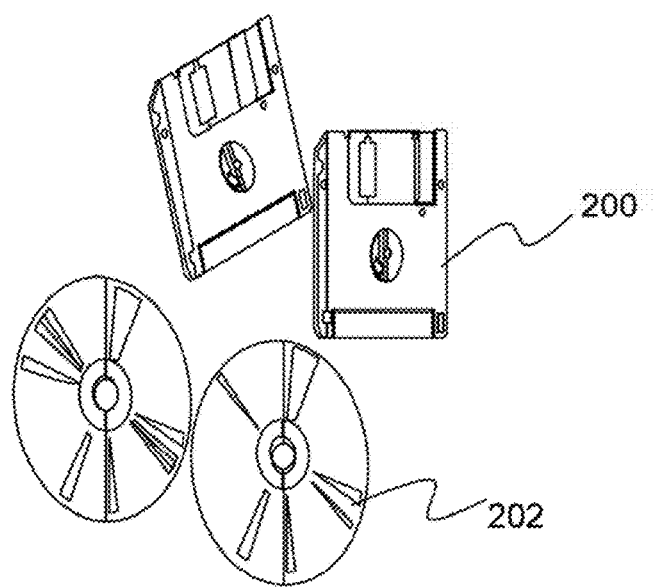
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Many known attacks on systems, such as automobile systems, involve some form of spoofing or altering CAN bus messages. For instance, if an attacker can cause another module to go into diagnostic mode, they can stop that module's messages from appearing on the bus, which allows the attacker to replace those messages with their own. Depending on the module, these spoof messages can potentially put passengers in serious danger. The system described herein defends against attacks like this by looking at the timing of the bus messages. Any attempt to spoof messages will have a difficult time avoiding alteration to the relative timing between messages. If the system can detect such timing alterations, then the system can be applied to detect a wide range of different attacks.

Thus, this disclosure provides a anomaly detection method that is suitable for detecting subtle changes in the timing of CAN Bus messages. The method starts by computing the transfer entropy (TE) matrix for message events. TE matrices (TEMs) are used to capture the causal relationship between the occurrence of one message event and another. The sparse and low rank (SLR) decomposition technique is then applied to learn the subspace of normal TE matrices. To determine whether the given observed data is normal or abnormal, the system calculates the TEMs of the timing of CAN Bus messages. Then, each TEM is decomposed into a component in the normal TEM subspace and a sparse residual component. The sparse residual components are used to determine whether the given data is normal or abnormal.

As can be appreciated by those skilled in the art, there are a number of applications in which the system and method described herein can be implemented. For example, the system can be incorporated into vehicles (e.g., car, airplane, drones, etc) for cybersecurity to address the problem of cyber intrusion detection for vehicles, and in particular automobiles. The growing media attention to hacked cars has made it very clear that many commercial automobiles are potentially vulnerable to life-threatening cyber-attacks. This system and method addresses the problem of detecting the presence of such attacks before they can cause serious harm, However, while the analysis described in this disclosure is focused on analysis of CAN bus data, which is particular to automobiles, there are similar data busses in other vehicles such as aircraft to which these same analysis techniques could apply. Given these similarities, the potential application of this invention could range anywhere from providing a cyber intrusion monitor for automobiles all the way to cyber intrusion monitoring for commercial aircraft.

(4) Specific Details of Various Embodiments

This disclosure provides a new anomaly detection method that is suitable for detecting subtle changes in the timing of CAN Bus messages. Many known attacks on automobiles involve some form of spoofing or altering CAN bus messages. For instance, if an attacker can cause another module to go into diagnostic mode, they can stop that module's messages from appearing on the bus and then they can replace those messages with their own. Depending on the module, these spoof messages can potentially put passengers in serious danger. The present invention defends against attacks like this by looking at the timing of the bus messages based on an assumption that any attempt to spoof messages will have a difficult time avoiding alteration to the relative timing between messages. Thus, if the system or method can detect such timing alterations, then the system can detect a wide range of different attacks.

Figure 3A:
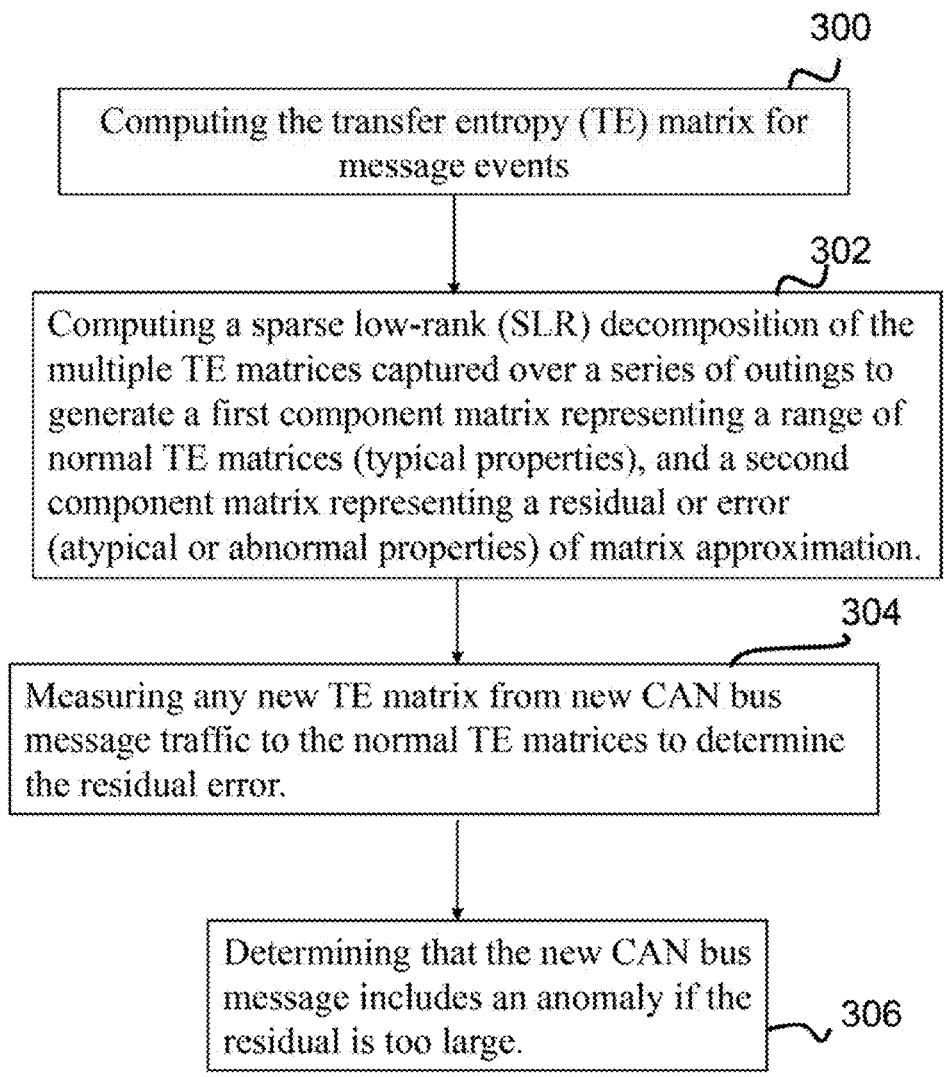
FIG. 3A is a flowchart illustrating a process of anomaly detection according to some embodiments of the present invention.
Figure 3B:
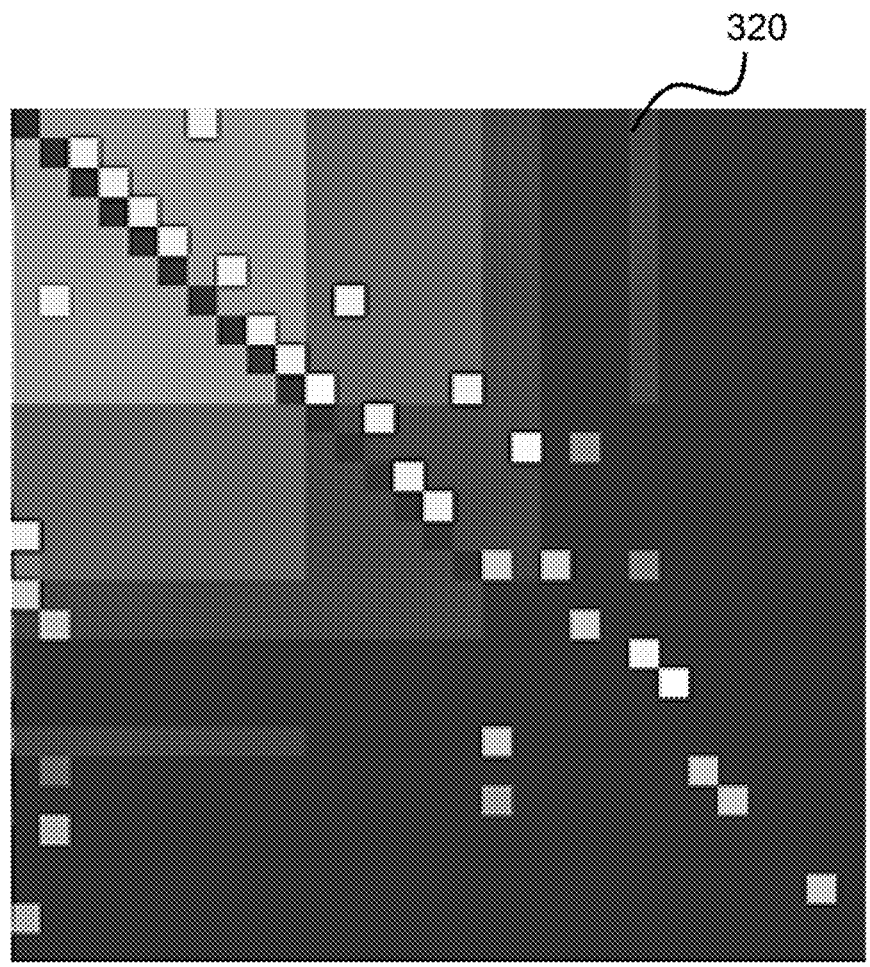
FIG. 3B is an illustration depicting an example Transfer Entropy Matrix (TEM)

As shown in FIG. 3A, the system starts by computing 300 the transfer entropy (TE) matrix (i.e., temporal dependency matrix) for message events of trusted messages to establish a normal baseline (i.e., which can be designated as a normal TE matrix under a normal operating conditions). An example of such a TE matrix 320 is shown in FIG. 3B. The Transfer Entropy analysis of a CAN Bus message time series provides a measure of time dependency between different message types. In the TE Matrix 320 in FIG. 3B (29×29 pixels, because there are 29 message types used), each column represents one of the several CAN Bus message types and the same is true for each row. Thus, the TE Matrix 320 is a temporal dependency matrix. Bright squares show where a message type in a given column tends to be preceded by a message type from the corresponding row.

Here, each message type is treated as a spike event, regardless of the message content. The time series of each message type is a spike time series where one represents an event of that message type. The matrix 320 captures the TE relationship between these message types. Essentially, if there is some causal relationship between the occurrence of one message type and another, that should be revealed in the TE matrix 320. With a suitable time-series of CAN Bus messages, the system ends up computing a time-series of TE matrices. These matrices capture the fact that message timing among message types and the underlying causal structure can change as a vehicle transitions between different driving modes.

Referring again to FIG. 3A, the next step is to compute 302 a sparse low-rank SLR decomposition of the multiple TE matrices captured over a series of outings (e.g., vehicle outings, etc). Assuming these are captured from a vehicle that has not been compromised, the SLR decomposition provides one matrix (the low-rank component) that is a compact representation of what the range of normal TE matrices should look like (under normal operation), and another matrix (the sparse component) that describes the aspects of the TE matrix that cannot be characterized by the low-rank component (abnormal properties). This is the residual or error of the matrix approximation.

Figure 4A:
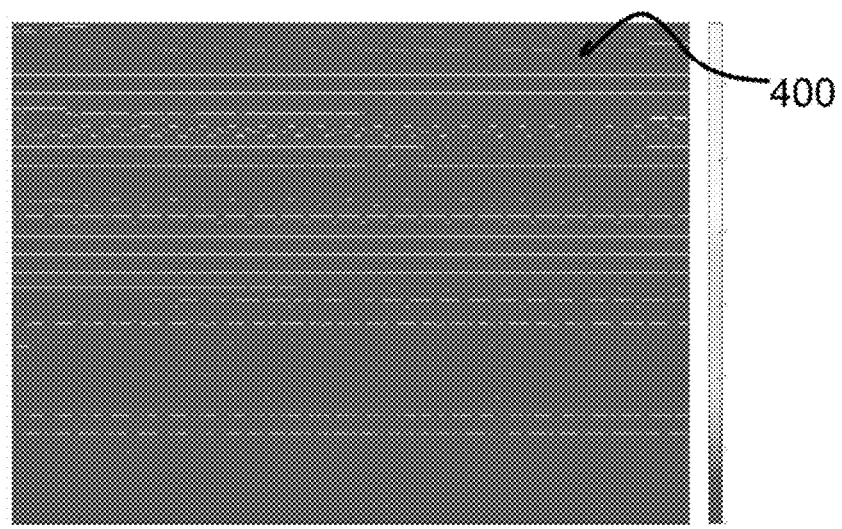
FIG. 4A is an illustration depicting an example TEM data matrix.
Figure 4B:
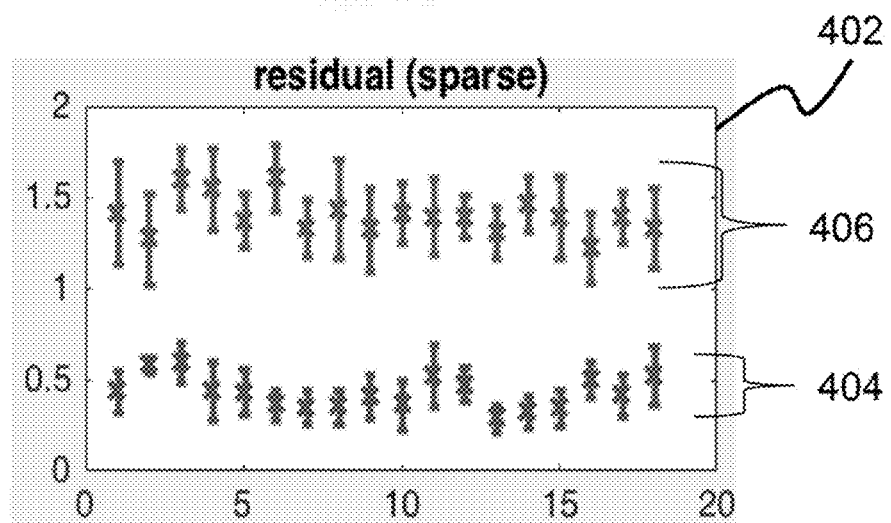
FIG. 4B is a graph depicting example results for 18 evaluations of corrupted data.

As noted above, using sparse low-rank decomposition, the system performed a best fit for known good patterns to a low-rank matrix combined with a sparse matrix. When new data is fit to this same low-rank matrix the multitude of the sparse matrix residual provides a measure of anomaly as shown in FIGS. 4A and 4B. FIG. 4A depicts a TEM data matrix 400 stacking each 29×29 TEM (an example TEM matrix is shown in FIG. 3B) as a column vector and showing the first 1000 columns. The y-axis represents the entry of the 29×29 TEM, while the x-axis represents time stamps, and the intensity bar represents the value of the TEM entries. FIG. 4B is a graph illustrating the result for 18 evaluations of the corrupted data. The error bars correspond to 18 different training sets 404 and corresponding test sets 406, where the test data has a single message type removed. In this example, it is observed that the error bars 406 of corrupted data are above the error bars 404 of normal data, indicating the ability of anomaly detection. Note that the x-axis represents each experiment, while the y-axis represents residual (the L1 norm of the sparse component, which is described later).

Referring again to FIG. 3A, once the residual or error of the matrix approximation is determined, the system can then look at any new TE matrix and measure 304 its similarity to the normal TE matrices by how small this residual is. If the residual is too large, then the system designates 306 that there is some anomaly in the CAN bus message traffic. A residual is too large if it is above the error bar of the normal TEM. Further details regarding the system and process are provided below.

(4.1) Transfer Entropy

Transfer entropy (TE) (e.g., see Literature Reference No. 4) is a directional measure of information flow between pairs of time series, such as power consumption, thermal status, and electromagnetic emissions side-channels, as well as CAN bus, messages. The present system uses TE to detect intrusions by identifying anomalies in the causal relationships between system modules (see Literature Reference No. 3 for a description of such system modules).

The system depicts the interactions among sensors as a graph with nodes and causal links where each node is a module. TE quantifies how much information is transferred from the current state into the future from one node to another and therefore is directional. The TE measure from node $x_j$ to node $x_i$ is defined as:

$$TE_{x_j \to x_i} = \sum p(x_{i,t+\tau}, x_{i,t}, x_{j,t}) \log \frac{p(x_{i,t+\tau} | x_{i,t}, x_{j,t})}{p(x_{i,t+\tau} | x_{i,t})},$$

where $\tau$ is the time delay/shift of information transport. The system finds the optimal time shift that maximizes time-delay dependent correlations, which allows the system to determine the strength of causal links. The nodes in this application are the message types.

Suspicious activities is inferred by monitoring the changes in causal structure of CAN Bus messages and side channels. For instance, a module might start processing messages that it had previously ignored, or start sending messages it shouldn't; this can make the causal structure deviate from normal. Using the scale-invariant TE measure (the scale-invariant TE measure is described in Literature Reference No. 5), the system can identify causal changes over a broad range of different time frames, represented by TE matrices.

(4.2) Sparse and Low Rank (SLR) Decomposition

SLR decomposition is a set of provably optimal and efficient mathematical techniques for identifying and decomposing the low-variation structure from high-dimensional raw data (see Literature Reference No. 1 for a detailed discussion of SLR). It is also known as Robust PCA because it is designed to handle grossly corrupted data, rather than assuming the data noise is independently and identically distributed Gaussian. Suppose that there is a stationary camera that is viewing a scene for the task of intruder or foreground detection. If there are many raw image frames obtained over the course of a day, each frame can be stacked as a column vector of the data matrix X, which can be decomposed to X=L+S, where L is the low-rank matrix that represents the background scene and S is the sparse matrix that represents the sparse foreground and deviations from the convex Lambertian model, e.g., shadows and reflection, that cannot be modeled as Gaussian noise. The low-rank matrix L is extremely low-rank relative to the image size, the length of the columns in X. It has been shown that the low-rank and sparse components of the data matrix X can be exactly decomposed by the following convex optimization, Principal Component Pursuit (PCP) (see Literature Reference No. 1):

$$\min_{L,S} \|L\|_* + \lambda \|S\|_1 \text{ subject to } X = L + S$$

where the nuclear norm $\|L\|_*$ takes the sum of the singular values of L and the $\ell_1$-norm $\|S\|_1$ is the absolute sum of the entries of S. The minimizer L provides a background template for stationary camera. The minimizer S contains the detected foreground.

(4.3) Learning Normal States of TEM with SLR

To apply SLR, the transfer entropy matrices are organized into a data matrix X, in which each column is a TEM. The fast SLR method is applied (the fast SLR method is described in Literature Reference No. 7), which decompose the matrix X into three matrices: a low-rank component L that represents the normal operation state structure, a sparse component S to tolerate a small number of the data matrix entries that deviates from the normal operation (abnormal operation), and a Gaussian noise component G. This is expressed in the following:

$$X=L+S+G, \text{ subject to rank}(L)\leq r, k\times n^2\times T,$$

where r is a small integer, $\|\cdot\|_0$ is the $\ell_0$-norm that is the number of nonzero entries, k is the sparsity percentage, $n^2$ is the size of the TEM, and T is the total number of TEMs, which are constructed by calculating the TEMs over sliding windows (these sliding windows are typically overlapping, but do not have to). This formulation can be solved by the following, optimization problem (see Literature Reference No. 7):

$$\{\hat{L}, \hat{S}\} = \underset{L,S}{\operatorname{argmin}} \|X - L - S\|_F^2, \text{ subject to rank}(L) \leq r, \|S\|_0 \leq k \times n^2 \times T,$$

where $\|\cdot\|_F$ is the Frobenius norm. The Frobenius norm is a matrix norm defined as $$\|A\|_F = \sqrt[2]{\sum_i \sum_j |a_{ij}|^2},$$

where $a_{ij}$ are the $ij^{th}$ entry of A. The optimization problem is solved by solving the following subproblems until convergence $$\begin{cases} L_t = \underset{L}{\operatorname{argmin}} \|X - L - S_{t-1}\|_F^2, & \text{subject to rank}(L) \leq r, \\ S_t = \underset{S}{\operatorname{argmin}} \|X - L_t - S\|_F^2, & \text{subject to } \|S\|_0 \leq k \times n^2 \times T. \end{cases}$$

The first subproblem, with the sparse matrix S fixed, is the PCA problem. The classical method to solve this is to perform SVD decomposition, sort the singular values in the descending order, and then keep the first r singular values and set the rest to zero. This gives the exact low rank matrix solution, but since SVD requires a cubic complexity, the algorithm is impractical for large datasets. The fast low-rank approximation method in Zhou et al. (i.e., Literature Reference No. 7) uses bilateral random projections (BRP). To approximate the low-rank matrix with rank r for a given matrix X (it would be $X-S_{t-1}$ for the first subproblem), the first step is to compute $Y_1=XA_1$ and $Y_2=X^TA_2$, where $A_1$ and $A_2$ are m×r and n×r random matrices, respectively. The rank-r approximation of X is then $Y_1(A_2^TY_1)^{-1}Y_2^T$. The computation is fast since $A_2^TY_1$ is a r×r matrix for a small r. The second subproblem is solved by hard-thresholding.

(4.4) Anomaly Detection Method with SLR of TEM

The anomaly detection method of this disclosure is described in the following stages and steps:

(4.4.1) Training:

Training requires a set of inputs. The inputs for normal data consists of the timing of the CAN bus messages for each message type. The training process proceeds as follows:

1. Construct TEMs over time, an n×n×T tensor $\mathbb{T}$ (e.g., 29×29×500 when there are 29 message types and the total number of sliding windows for training is 500). Although not limited thereto, these are the numbers in the example reduction to practice section. Each TEM is obtained by calculating the TE values of pairwise message timing over a time window of duration $\Delta_t$.

2. Generate the $n^2 \times T$ training data matrix X by stacking TEMs as column vectors. For example, the dimension of the data matrix is 841×14751.

3. Decompose the data matrix X with SLR:
   X=L+S+G subject to rank $(L)\leq r$, $\|S\|_0 \leq k \times n^2 \times T$ and get the basis vector set $U_k$ (the basis vectors with the largest x singular values) from the extracted low rank matrix L.

4. For each column vector x of the data matrix X, decompose it into three components: $x=x_L+x_S+x_G$, where $x_L$ is the projection of x onto the $U_k$ vector space, and $x_s$ is the sparse component of x in the orthogonal space $U_k$ and $x_G$, is the residual.

5. Compute the mean μ and standard deviation σ of the $\ell_1$ norm of the sparse component, $\|x_S\|_1$, over all column vectors x.

The training process described above results in a set of outputs, the outputs being basis vector space $U_k$, error mean μ and standard deviation σ of the sparse errors under normal conditions.

(4.4.2) Detection

Once the system is set, it is operable to monitor messages and detect anomalies in the messages. For example, during operation, inputs into the system. include observed data that comprises the timing of the CAN bus messages for each message type. Detection also uses the basis vector space $U_k$, error mean $\mu$ and standard deviation $\sigma$ of the sparse errors obtained from training. The are at least two methods for implementing the system on input data. Method One is directed to batch processing. For example, a vehicle may have a large batch of messages in the system and periodically performs a diagnostic function where a batch of messages are input through the system for anomaly detection. Alternatively, Method Two is directed to stream processing. For example, the vehicle or other system simply processes the messages as they stream into or through the vehicle or other system. Each of these methods are described in further detail below.

(4.4.2.1) Method One (for batch processing):

1. Construct TEMs over time, an n×n×t tensor $\mathbb{T}_{test}$, where each TEM is obtained by calculating the TE values of pairwise message timing over a time window of duration $\Delta_t$. The variable t indicates the number of sliding windows (each window with duration $\Delta_t$).

2. Reshape $\mathbb{T}_{test}$ into an $n^2 \times t$ matrix Z by stacking TEMs as column vectors.

3. For each column vector z of the testing matrix Z, decompose it into three components: $z=z_L+z_S+z_G$, where $z_L$ is the projection of z onto the $U_k$ vector space, and $z_S$ is the sparse component of z in the orthogonal space $U_k$ and $z_G$ is the residual.

4. Compute the mean $\mu_{test}$ and standard deviation $\sigma_{test}$ of the $\ell_1$ norm of the sparse component, $\|z_S\|_1$, over all column vectors z.

5. Perform a statistical test such as a t-test to determine if the mean $\mu_{test}$ and standard deviation $\sigma_{test}$ is above a predetermined error threshold relative to the mean $\mu$ and standard deviation $\sigma$, in which case the system indicates the input data contains abnormal activities.

The output in this process are the mean $\mu$ and standard deviation $\sigma$ of the sparse errors, and an anomaly indicator indicating that the input data contains abnormal activities.

(4.4.2.2) Method Two (for stream processing):

1. At each time interval $\Delta_t$, calculate the TE values of pairwise message timing over that time window to obtain an n×n TEM.

2. Reshape this n×n TEM into an $n^2$ vector z.

3. Decompose vector z into three components: $z=z_L+z_S+z_G$, where $z_L$ is the projection of z onto the $U_k$ vector space obtained from training, and $z_S$ is the sparse component of z in the orthogonal space $U_k$ and $z_G$ is the residual.

4. Compute the $\ell_1$ norm of the sparse component, $\|z_S\|_1$.

5. Evaluate whether $\|z_S\|_1 > \mu + p\sigma$, where p is a pre-determined threshold that defines a level outside of normal sufficient to trigger an anomaly warning.

The output in this method is an anomaly warning each time $\|z_S\|_1 > \mu + p\sigma$.

Method One evaluates multiple TEMs to get statistics of the sparse error for anomaly detection, while Method Two evaluates an individual TEM to give anomaly warning at each time step. The anomaly indicator of Method One is less likely to produce false alarms because it is looking at a longer window of the data; while Method Two provides quicker feedback since it only evaluates a single TEM, so it is better suited to detect momentary backs that interfere with CAN Bus activity for a very short time. Furthermore, after an anomaly detection or warning is activated, by identifying the entries in $z_S$ that are large in magnitude, the system can zero in on the particular message types that are corrupted. This may provide sonic insight in to the type of hack that is being attempted and into the particular vehicle subsystems that the hacker is attempting to influence.

(4.4.3) Response

Once an attack is detected, there are many options for response. A key concern is that the response not be more harmful than the hack itself. Therefore, it is essential that the response to a detected hack does not interfere with the normal safe operation of the vehicle (or other system in which the invention is implemented), especially since the vehicle is likely to be in motion at the time the attack is detected. This invention proposes the following non-limiting set of alternative reactive responses that may be initiated in reaction to detecting anomalous data or an intrusion:

1. Upon anomaly detection, the system provides a warning light or sound to the driver so they are aware immediately that there could be a problem. This would then leave the driver to decide appropriate actions given the current circumstances. For instance, if the driver is on a freeway traveling at high speeds, they may decide to exit the freeway as soon as possible and stick to surface roads until they can get to a nearby dealer.

2. Upon anomaly detection, the system provides an electronic message to the auto manufacturer. Manufacturers may be able to collect hack information from multiple vehicles and thereby determine a potential threat of a multi-vehicle attack.

3. Upon anomaly detection, the system triggers or initiates a "safe-mode" for the vehicle that temporarily disables all advanced automated driving and automated parking accessories that have the potential to control brakes, steering, or other vital functions. It would also cut off all non-essential access to the CAN Bus from components such as the infotainment system and any CAN Bus plug-in devices. Essentially, in such a safe-mode, the vehicle would be drivable but would be temporarily missing most of the added luxury features that enhance the driving experience. Resetting the vehicle out of the "safe-mode" would require either a visit to the dealer or a remote software refresh.

(4.5) Reduction to Practice

Figure 5A:
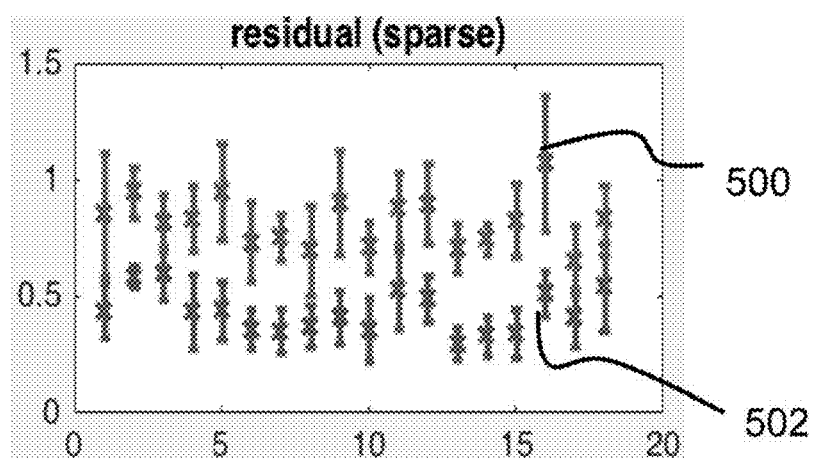
FIG. 5A is a graph depicting example results where all messages of a given type are delayed by a small-time delta.
Figure 5B:
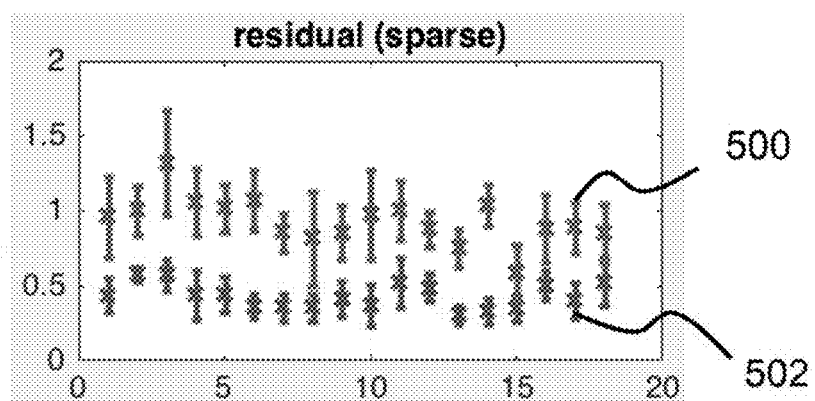
FIG. 5B is a graph depicting example results where the first message to follow a given message type are removed.
Figure 5C:
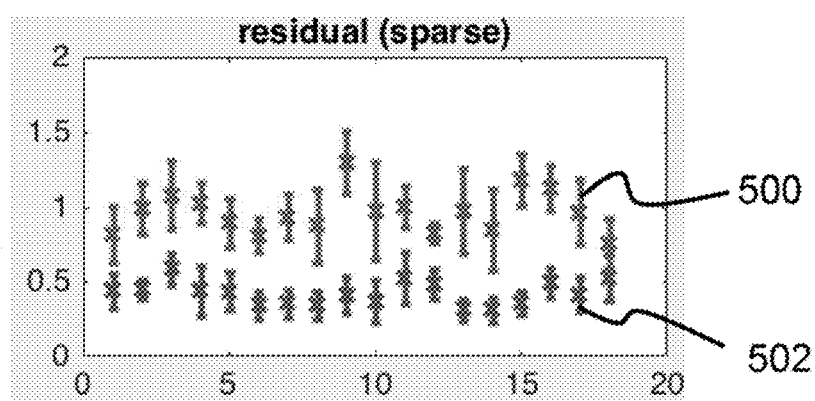
FIG. 5C is a graph depicting example results where the second message to follow a given message type are removed.

To demonstrate that the system as described herein works effectively, the anomaly detection method was performed using CAN Bus data collected from a vehicle. The data consists of the time stamps of the message activities, which are the message types, along with the contents in the message types. Time series were constructed of each message type (there are 29 message types and the length of the time series is 15251), using the collective time stamps of the message activities. Each time series is a sequence of 0's and 1's, where 0 indicates no activity of the message type at the time stamp and 1 indicates an activity of the message type at the time stamp. The time window interval $\Delta_t$ for TEM calculation is 500, and there are 14751 windows. From this data, a subset (T=500) of time series were extracted that were unaltered for training and another subset of time series (t=500) was manually altered in various ways to emulate various types of attacks. For instance and as shown in FIG. 5A, the normal data was altered by delaying the occurrence of one particular message type in the time series. This might mimic the effects of an attacker who purposely blocks a particular message whenever it occurs on the bus but then re-inserts a message of the same type with different contents. In another data set and as shown in FIG. 5B, the occurrences of the first message were removed to follow a particular message type. In a third data set and as shown in FIG. 5C, the second message was removed to follow a particular message type. The results of these tests (with Method One) are shown in FIGS. 5A through 5C. In each plot, 18 results are shown from 18 sets of training and testing data. The error bars show magnitude of the residual within one standard deviation. The normal data error bars 502 are for the normal data and the evaluation error bars 500 are for the modified data. A true anomaly detection occurs when the evaluation error bar 500 (those on the top portion of the graph in this example) is above the normal data error bar 502. It was observed that most of the two error bars are well separated, indicating the ability of detect anomaly. Thus, using sparse low-rank decomposition, the system can identify anomalies even when relatively subtle changes are made to the CAN Bus time series.

Figure 6:
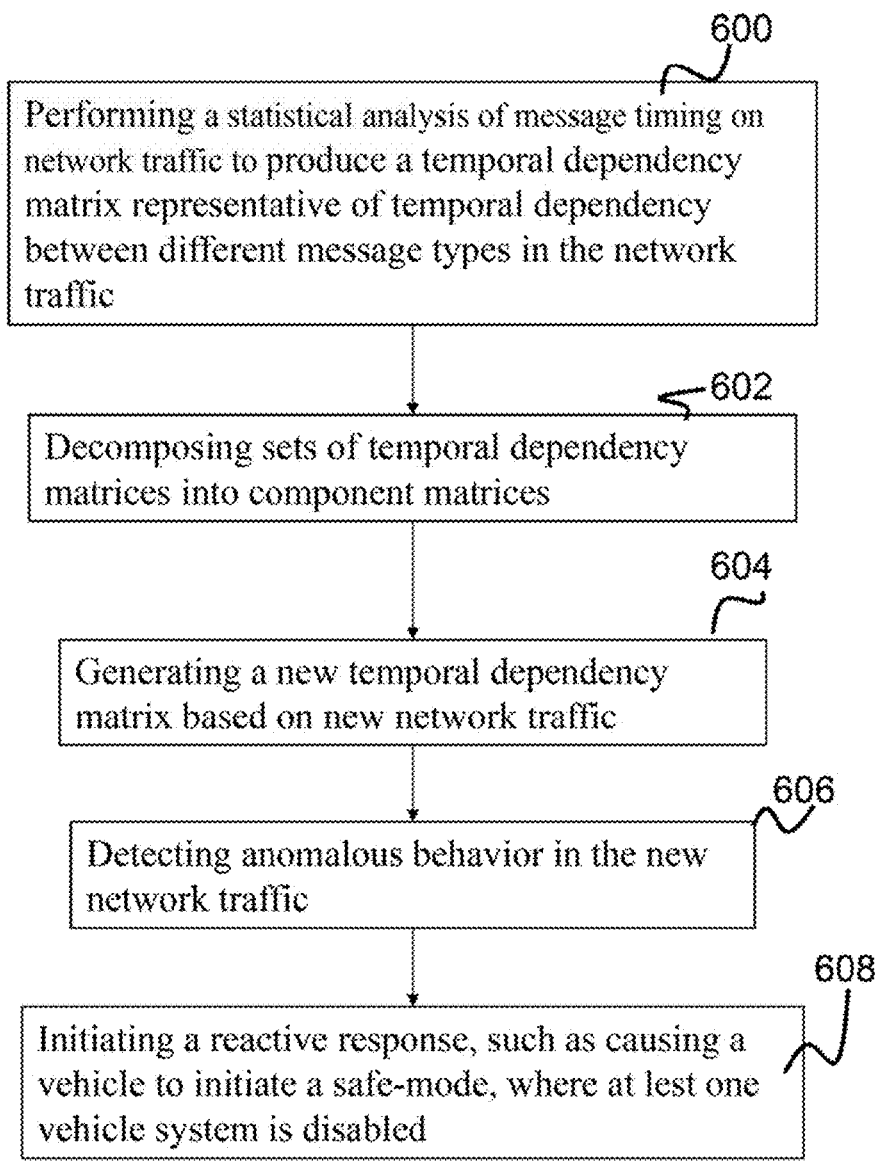
FIG. 6 is a flow chart depicting a process flow for the system in various embodiments.

Thus, in summary and as shown in FIG. 6, the system operates in, some embodiments by performing a statistical analysis 600 of message timing or network traffic to produce a temporal dependency matrix representative of temporal dependency between different message types in the network traffic; decomposing sets of temporal dependency matrices into component matrices 602; generating a new temporal dependency matrix based on new network traffic 604; and detecting anomalous behavior in the new network traffic 606. A variety of actions can be irritated if anomalous behavior is detected. For example, the system can initiate a reactive response 608, such as causing a vehicle to initiate a safe-mode, where at lest one vehicle system is disabled.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fail within the scope of the present invention.

What is claimed is:

1. A system for detecting cyber intrusions based on analysis of network traffic, the system comprising:
   one or more processors and a memory, the memory being a non-transitory computer-readable medium having executable instructions encoded thereon, such that upon execution of the instructions, the one or more processors perform operations of:
   performing a statistical analysis of message timing on network traffic to produce a temporal dependency matrix representative of temporal dependency between different message types in the network traffic;
   decomposing sets of temporal dependency matrices into component matrices, where at least one component matrix represents typical properties of these matrices and at least one other component matrix represents atypical properties of the matrices;
   generating a new temporal dependency matrix based on new network traffic; and
   detecting anomalous behavior in the new network traffic by comparing component matrices of the new temporal dependency matrix with component matrices of the temporal dependency matrices under normal operating conditions.

2. The system as set forth in claim 1, wherein temporal dependency matrix representative of temporal dependency between different message types in the network traffic is a Transfer Entropy Matrix (TEM) produced using Transfer Entropy calculations.

3. The system as set forth in claim 2, wherein decomposing sets of temporal dependency matrices into component matrices is performed using sparse low-rank decomposition.

4. The system as set forth in claim 3, wherein detecting anomalous behavior in the new network traffic is performed by first performing sparse low-rank decomposition of individual Transfer Entropy matrices (TEM) and then comparing an $\ell_1$ norm of a sparse component, $\|z_S\|_1$ with a mean of a training set norm.

5. The system as set forth in claim 4, wherein detecting anomalous behavior in the new network traffic further comprises determining a norm and standard deviation from sparse low-rank decompositions of multiple TEMs and performing a t-test to determine when the new network traffic exceeds a pre-set bound.

6. The system as set forth in claim 5, wherein upon detecting anomalous behavior in the new network traffic, further comprising an operation of initiating a reactive response.

7. The system as set forth in claim 6, wherein the reactive response includes causing a vehicle to initiate a safe-mode, where at least one vehicle system is disabled.

8. The system as set forth in claim 1, wherein decomposing sets of temporal dependency matrices into component matrices is performed using sparse low-rank decomposition.

9. The system as set forth in claim 1, wherein detecting anomalous behavior in the new network traffic is performed by first performing sparse low-rank decomposition of individual Transfer Entropy matrices (TEM) and then comparing an $\ell_1$ norm of a sparse component, $\|z_S\|_1$ with a mean of a training set norm.

10. The system as set forth in claim 1, wherein detecting anomalous behavior in the new network traffic further comprises determining a norm and standard deviation from sparse low-rank decompositions of multiple Transfer Entropy matrices (TEM) and performing a t-test to determine when the new network traffic exceeds a pre-set bound.

11. The system as set forth in claim 1, wherein upon detecting anomalous behavior in the new network traffic, further comprising an operation of initiating a reactive response.

12. The system as set forth in claim 11, wherein the reactive response includes causing a vehicle to initiate a safe-mode, where at lest one vehicle system is disabled.

13. A computer program product for detecting cyber intrusions based on analysis of network traffic, the computer program product comprising:
   a non-transitory computer-readable medium having executable instructions encoded thereon, such that upon execution of the instructions by one or more processors, the one or more processors perform operations of:
   performing a statistical analysis of message timing on network traffic to produce a temporal dependency matrix representative of temporal dependency between different message types in the network traffic;
   decomposing sets of temporal dependency matrices into component matrices, where at least one component matrix represents typical properties of these matrices and at least one other component matrix represents atypical properties of the matrices;

generating a new temporal dependency matrix based on new network traffic; and detecting anomalous behavior in the new network traffic by comparing component matrices of the new temporal dependency matrix with component matrices of the temporal dependency matrices under normal operating conditions.

14. The computer program product as set forth in claim 13, wherein temporal dependency matrix representative of temporal dependency between different message types in the network traffic is a Transfer Entropy Matrix (TEM) produced using Transfer Entropy calculations.

15. The computer program product as set forth in claim 13, wherein decomposing sets of temporal dependency matrices into component matrices is performed using sparse low-rank decomposition.

16. The computer program product as set forth in claim 13, wherein detecting anomalous behavior in the new network traffic is performed by first performing sparse low-rank decomposition of individual Transfer Entropy matrices (TEM) and then comparing an $\ell_1$ norm of a sparse component, $\|z_S\|_1$ with a mean of a training set norm.

17. The computer program product as set forth in claim 13, wherein detecting anomalous behavior in the new network traffic further comprises determining a norm and standard deviation from sparse low-rank decompositions of multiple Transfer Entropy matrices (TEMs) and performing a t-test to determine when the new network traffic exceeds a pre-set bound.

18. The computer program product as set forth in claim 13, wherein upon detecting anomalous behavior in the new network traffic, further comprising instructions for causing the one or more processors to perform an operation of initiating a reactive response.

19. The computer program product as set forth in claim 18, wherein the reactive response includes causing a vehicle to initiate a safe-mode, where at least one vehicle system is disabled.

20. A computer implemented method for detecting cyber intrusions based on analysis of network traffic, the method comprising an act of:

causing one or more processors to execute instructions encoded on a non-transitory computer-readable medium, such that upon execution, the one or more processors perform operations of:

performing a statistical analysis of message timing on network traffic to produce a temporal dependency matrix representative of temporal dependency between different message types in the network traffic;

decomposing sets of temporal dependency matrices into component matrices, where at least one component matrix represents typical properties of these matrices and at least one other component matrix represents atypical properties of the matrices;

generating a new temporal dependency matrix based on new network traffic; and detecting anomalous behavior in the new network traffic by comparing component matrices of the new temporal dependency matrix with component matrices of the temporal dependency matrices under normal operating conditions.

21. The computer implemented method as set forth in claim 20, wherein temporal dependency matrix representative of temporal dependency between different message types in the network traffic is a Transfer Entropy Matrix (TEM) produced using Transfer Entropy calculations.

22. The computer implemented method as set forth in claim 20, wherein decomposing sets of temporal dependency matrices into component matrices is performed using sparse low-rank decomposition.

23. The computer implemented method as set forth in claim 20, wherein detecting anomalous behavior in the new network traffic is performed by first performing sparse low-rank decomposition of individual Transfer Entropy matrices (TEM) and then comparing an $\ell_1$ norm of a sparse component, $\|z_S\|_1$ with a mean of a training set norm.

24. The computer implemented method as set forth in claim 20, wherein detecting anomalous behavior in the new network traffic further comprises determining a norm and standard deviation from sparse low-rank decompositions of multiple Transfer Entropy matrices (TEMs) and performing a t-test to determine when the new network traffic exceeds a pre-set bound.

25. The computer implemented method as set forth in claim 20, wherein upon detecting anomalous behavior in the new network traffic, further comprising an operation of initiating a reactive response.

26. The computer implemented method as set forth in claim 25, wherein the reactive response includes causing a vehicle to initiate a safe-mode, where at least one vehicle system is disabled.

* * * * *